United States Patent [19]

Svehaug

[11] Patent Number: 5,142,833
[45] Date of Patent: Sep. 1, 1992

[54] CAMOUFLAGE SCREEN

[76] Inventor: Oswald C. Svehaug, 1010 San Ysidro Blvd., San Ysidro, Calif. 92073

[21] Appl. No.: 665,881

[22] Filed: Mar. 7, 1991

[51] Int. Cl.$^5$ ............... E04B 1/344; A01M 31/00
[52] U.S. Cl. ............................ 52/71; 43/1; 428/919
[58] Field of Search .............. 52/69, 71, 169.1, 169.2; 43/1, 2; 428/919; 206/566, 581

[56] References Cited

U.S. PATENT DOCUMENTS

| | | |
|---|---|---|
| 1,274,645 | 8/1918 | Wasylowich . |
| 3,052,054 | 9/1962 | Littleton et al. . |
| 3,442,275 | 5/1969 | Ternes . |
| 3,823,418 | 7/1974 | Piper . |
| 4,164,089 | 8/1979 | George . |
| 4,302,068 | 11/1981 | Tyroler ............... 428/919 |
| 4,364,193 | 12/1982 | Visco ................... 43/1 |
| 4,375,488 | 3/1983 | Hogan . |
| 4,506,467 | 3/1985 | Strung ................... 43/1 |
| 4,848,586 | 7/1989 | Jasik ................... 206/581 |
| 4,876,817 | 10/1989 | Hill . |

Primary Examiner—Michael Safavi
Attorney, Agent, or Firm—Henri J. A. Charmasson

[57] ABSTRACT

A camouflage screen consists essentially of a reflective panel held in front of the user in a position upwardly slanted away from him. The panel reflects an image of the surrounding terrain to any distant observer. A loophole in the middle of the panel is provided for observation and/or for discharge of a firearm therethrough.

6 Claims, 1 Drawing Sheet

CAMOUFLAGE SCREEN

FIELD OF THE INVENTION

This invention relates to portable blinds to be used by hunters, photographers, naturalists, or the like in a outdoor setting.

BACKGROUND OF THE INVENTION

The art of camouflage consists in hiding a person or object from view by a prey or foe. This is normally achieved by changing the outward appearance of the camouflaged object or person so that it cannot be distinguished from the surrounding landscape. As evidenced by the camouflage devices disclosed in U.S. Pat. No. 3,823,418 George and U.S. Pat. No. 4,364,193 Bisco. The camouflaging garment or screen is painted to reflect the colors and features of the surroundings. If the colors and features of the camouflage do not exactly match the colors and features of the surroundings, the camouflage may stand out against the background and fail to accomplish its purpose. A green and brown camouflage may be quite effective in a wooded setting, but become inappropriate in a desert environment where yellow is the dominant color. Thus a plurality of camouflages might be needed if the person or object to be hidden must travel across different types of terrain. Nature provides an ideal camouflage to some animals such as the chameleon which can adjust the color and tone of its skin to those of its surroundings.

Accordingly, there is a need for a more versatile type of camouflage that will readily adapt to the change in the colors and features of the surroundings where it is being used.

SUMMARY OF THE INVENTION

The principal and secondary objects of this invention are to provide a simple camouflaging device which automatically adapts itself to the colors and features of the surrounding terrain;

to provide such a camouflage in a conveniently portable and easily storable configuration which can be quickly put in place and moved while keeping its hiding character.

These and other objects are achieved by a screen including a reflective panel held in front of the user in a position upwardly slanted away from him. The panel reflects an image of the surrounding terrain to any distal observer. A small opening cut through the middle of the panel can be used to observe or shoot at the prey or foe.

DESCRIPTION OF THE PREFERRED EMBODIMENT OF THE INVENTION

Figure 1:
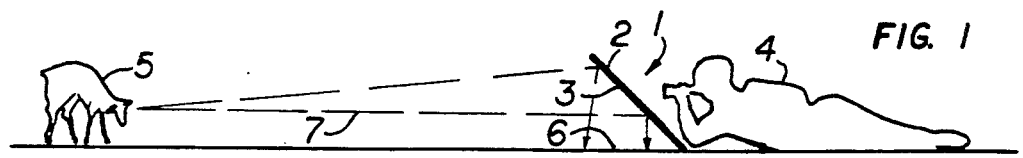
FIG. 1 illustrates the use of the camouflaging screen in the observation of wildlife by a naturalist or hunter.
Figure 2:
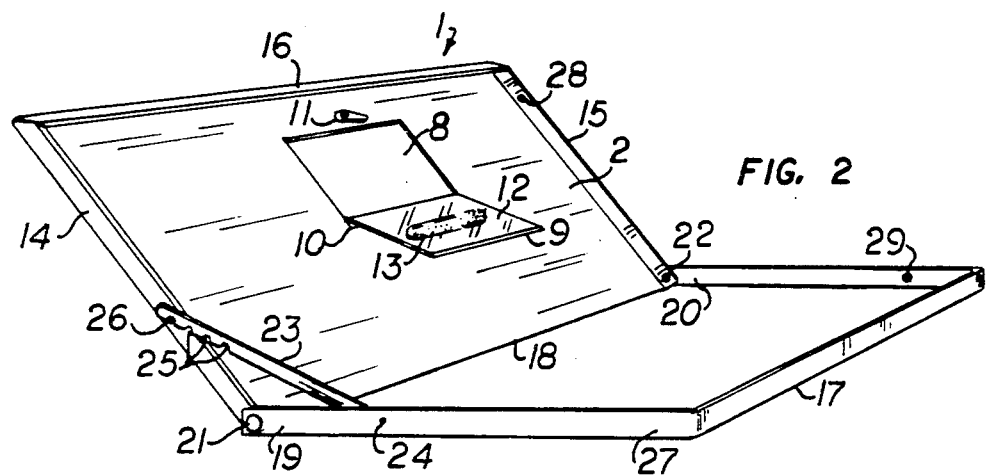
FIG. 2 is a perspective view of the camouflage screen in its deployed position.

Referring now to the drawing, the preferred embodiment of the invention will be described. The camouflage screen 1 of the instant invention essentially consists of a panel 2 which has a reflective outward surface 3. The a panel 2 is shaped and dimensioned to hide its user 4 from view by a prey 5 remotely located. The panel 2 is slanted upwardly toward the prey 5 at an angle of approximately 45 degrees so that the prey looking toward the camouflage screen 1 sees only a reflection of the ground area 6 immediately in front of the apparatus. The slanted orientation of the panel 2 should be adjusted so that it forms an angle of approximately 45 degrees with the line of sight 7 of the prey. If the prey is at a higher altitude than the observer 4, then the orientation of the panel may be raised to a higher angle with the ground surface. Similarly, if the prey 5 is at a lower altitude than the observer 4, the orientation of the panel should be adjusted to a sharper angle in order to guarantee that the prey will see a reflection of the surrounding ground and not its own reflection.

An opening 8 is cut through the center of the panel. The opening may be closed by a door or flap 9 rotatively attached to the lower edge of the opening by a hinge 10. The door may be held in its closed position by a rotating catch 11. The outer face 12 of the flap 9 has the same reflective characteristics as the outer face 3 of the panel. A horizontal, oblong transparent area 13 in the middle of the flap 9 provides a peep-hole through which the prey 5 can be observed. When the flap is open the opening forms a loop-hole through which a firearm can be discharged toward the prey 5.

The panel 2 consists essentially of a thin sheet of metal which is reinforced by lateral flanges 14, 15 and a top flange 16. While the lateral flanges 14, 15 form a right angle with the surface of the panel 2, the top flange 16 is bent at an angle of approximately 45 degrees and away from the prey 5 so that it cannot be seen by it.

Figure 3:
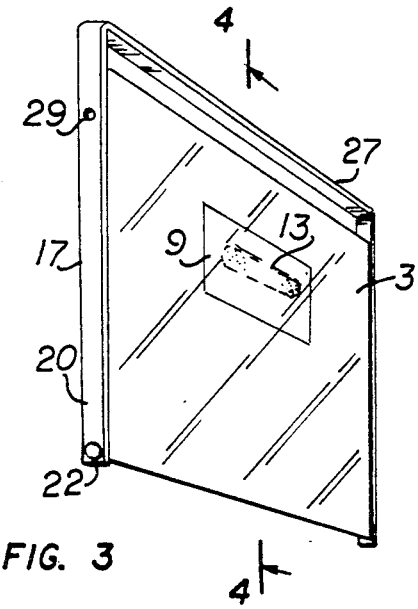
FIG. 3 is a perspective view thereof in a folded position.
Figure 4:
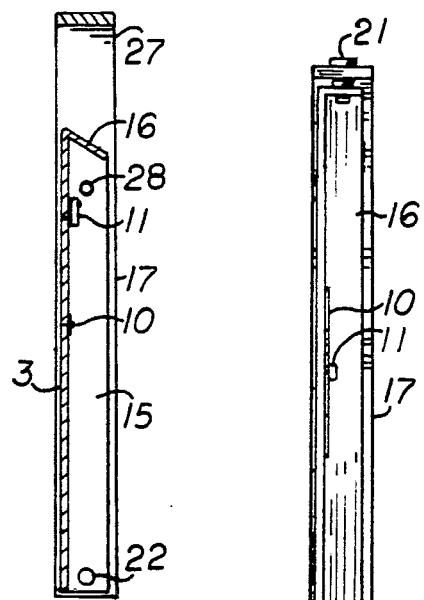
FIG. 4 is a cross-sectional view of the folded screen taken along line 4—4 of FIG. 3.
Figure 5:
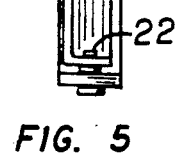
FIG. 5 is a bottom plan view of the folded screen.

A U-shaped frame 17 is hinged on its open side to the bottom edge 18 of the panel. More specifically, the ends 19, 20 of the frame arms are connected by pins 21, 22 to the lower ends of the lateral flanges 14, 15. A positioning lever 23 pivotally connected by a pin 24 to one arm of the frame 17 adjustably engages a pin 26 on the outer face of lateral flange 14 through a series of notches 25 at the opposite end of the lever. With the frame 17 lying on the ground, the angular orientation of the panel 2 toward the prey 5 can thus be adjusted, or the entire panel 2 can be folded back and nested within the frame 17 as illustrated in FIGS. 3, 4 and 5. The upper end 27 of the frame opposite the hinged ends 19, 20 extends beyond the top edge of the panel in the folded position to form a convenient carrying handle. A detent nib 28 in the upper part of lateral flange 15 engages and locks into a hole 29 in the frame 17 to hold the panel in its folded position within the frame.

The outer face 3 of the panel may be mirrored by polishing or by a vacuum deposit of silver or other reflective material.

It should be understood that the panel 2 may be made out of a variety of material, including a pliable and flexible film of mylar or other reflective material stretched across a collapsible frame. Similarly, the holding frame 17 may be replaced by an equivalent structure such a stakes to be planted into the ground.

Figure 6:
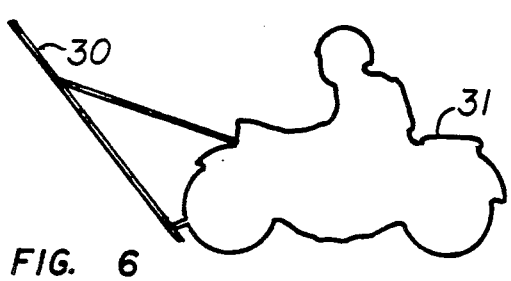
FIG. 6 illustrates the use of the invention in connection with a vehicle.

The structure described in connection with the preferred embodiment can also be adapted for use with a vehicle as illustrated in FIG. 6 where a reflective screen 30 is secured to the front of a vehicle 31. The screen itself 30 can assume different shapes and sizes including an irregular shape for better blending with the surrounding landscape.

While the preferred embodiments of the invention have been described, modifications can be made and other embodiments may be devised without departing from the spirit of the invention and the scope of the appended claims.

What is claimed is:

1. An outdoors camouflaging apparatus for hiding a first subject from a distally located second subject which comprises:

a structure installable in front of the first subject, said structure being shaped and dimensioned to obstruct the view of the first subject by the second subject, and including means for reflecting an image of the ground surface in front of said structure toward the second subject;

wherein said means for reflecting comprises a forward side of said structure facing the second subject being reflective and being upwardly slanted toward the second subject, said side comprising a see-through window shaped and dimensioned to allow the observation therethrough of the second subject by the first subject;

said structure comprising a generally flat panel having a reflective surface extending over an entire forward face; and means for holding said panel in a slanted position above ground;

said means for holding comprising a substantially planar frame; and means for mounting said panel at a sharp angle above said frame including means for hingedly connecting a lower edge of said panel to a first side of said frame.

2. The apparatus of claim 1, wherein said frame is commensurate with said panel.

3. The apparatus of claim 2, wherein said frame comprises a generally U-shaped member having two open side ends hingedly connected to the lower edge of said panel.

4. The apparatus of claim 3, wherein a median section of said member opposite said first side is shaped and dimensioned to form a carrying handle.

5. An outdoors camouflaging apparatus for hiding a first subject from a distally located second subject which comprises:

a structure installable in front of the first subject, said structure being shaped and dimensioned to obstruct the view of the first subject by the second subject, and including means for reflecting an image of the ground surface in front of said structure toward the second subject;

wherein said means for reflecting comprises a forward side of said structure facing the second subject being reflective and being upwardly slanted toward the second subject, said side comprising a see-through window shaped and dimensioned to allow the observation therethrough of the second subject by the first subject;

said structure comprising a generally flat panel having a reflective surface extending over an entire forward face; and means for holding said panel in a slanted position above ground, said means for holding comprising a substantially planar frame, and means for mounting said panel at a sharp angle above said frame; and wherein said window comprises a movable closing flap.

6. The apparatus of claim 5, wherein said flap comprises a transparent section.

* * * * *